Patented Aug. 5, 1952

2,606,123

UNITED STATES PATENT OFFICE 2,606,123

PRINTING INK

Alfred F. Schmutzler, Teaneck, N. J., and
Donald F. Othmer, Coudersport, Pa.

No Drawing. Application September 26, 1950,
Serial No. 186,911

12 Claims. (Cl. 106—24)

This invention relates to printing inks, and more particularly to printing inks which harden by exposure to steam.

Printing inks which harden by the application of moisture in the form of steam or water consist of compositions made from a water-miscible liquid, such as ethylene glycol, diethylene glycol or the like, in which there is dispersed a water-insoluble binder, such as zein, a resin, and a coloring material, such as a pigment of the character of carbon black, chrome yellow, or the like, or a dyestuff. The hardening of the printed ink film is caused by exposure to steam or water. During the process of setting, the water-miscible liquid absorbs sufficient water to cause the precipitation of the binder with the pigment. Due to the nature of the process, it is necessary for the binder to be sufficiently moisture-sensitive so that the addition of water to the organic liquid causes its separation, but the binder should have an adequate tolerance for moisture so that it will not prematurely precipitate.

Usually inks made with zein are too sensitive to high humidities, such as about 50%, resulting in a breakdown on the printing press, with consequent failure of proper distribution on the rollers and the resultant failure of the printing process.

In our copending application S. N. 115,552, now abandoned, filed September 13, 1949, and also in our Patent #2,482,879, it is disclosed that printing inks made by suspending coloring materials in a colloidal dispersion of from 20 to 35% of soybean protein containing from 95% upwards of pure protein dispersion in diethylene glycol, using 6% of guanidine carbonate as the dispersing agent, and made up to an apparent viscosity of 10 to 30 poises, as described by Schmutzler and Othmer, Industrial and Engineering Chemistry, 35, 1196–1202 (1943), have a tolerance for moisture and therefore, as contrasted with zein protein inks, do not break down on the press at high humidities and satisfactorily harden if their printed films are exposed to steam. They may be used where water resistance of the printed film is not a factor of paramout importance. This soybean protein-diethylene glycol dispersion, it has been disclosed, can be used with high oil absorption pigments, such as carbon black, benzidine yellow, Prussian blue and the like.

In our copending application S. N. 115,552, filed September 13, 1949, of which this application is a continuation-in-part, it is shown that, in the preparation of soybean protein dispersion in diethylene glycol in the presence of guanidine carbonate, some length of time was involved when the items soybean protein, guanidine carbonate, and diethylene glycol had to be kept at an intermediate reaction period of about 125° C. in order to prevent excessive foaming. After that period when foaming subsided, it was possible to heat the contents to a higher temperature for adjusting the dispersion to the desired viscosity. When amines are substituted for guanidine carbonate, no intermediate reaction period is required; the items, such as soybean protein, diethylene glycol and diethylene triamine, can be heated immediately to the desired reaction period, as there is little or just a negligible volume of foam. When diethylene triamine is substituted for guanidine carbonate, there is also an additional advantage; it consists of the possibility of using lower reaction periods. Should the normal reaction temperatures as with guanidine carbonate be used, shorter processing times are possible.

Other amines, ethylene diamine, triethylene tetramine tetraethylene pentamine, ethylamine, diethylamine, triethylamine, tetraethylamine, propylamines, butylamines, pentylamines, hexylamines or the like can be substituted for diethylene triamine with similar results. With the higher and more complex amines, a somewhat greater amount of amine has to be used for obtaining the same viscosities as with the lower amines. Since it is desirable to have the dispersions of soybean protein as free of excess water as possible, the substitution of ethylene diamine, methylamine, dimethylamine, and trimethylamine are recommended to be done as the anhydrous solution of the glycols. The preparation of these solutions can be accomplished by passing the gaseous amine into the glycol or by dissolving the aqueous amine solution in the glycol and separating the water by distillation or azeotropic distillation.

By means of azeotropic distillation, a different modification of processing the dispersions is possible. The soybean protein, glycol, and the aqueous solution of the amine can be brought together in a suitable reaction vessel, supplied with agitator, thermometer and azeotropic distillation arrangement for separating water from the water-immiscible solvent, which preferably is an inert hydrocarbon, such as benzol, toluol, xylol, octane, or the like. The soybean protein disperses more readily in the presence of water, and the dispersion is heated to a temperature when the azeotropic distillation takes place. The water is preferably measured; and when all or the desired amount has been taken off, the processing is terminated. The advantage of the modified process consists in having a homogeneous dispersion almost from the start of the heating cycle, as the protein readily dissolves in an aqueous solution of the amine. With the higher amines which are commercially available substantially anhydrous, the same principle is applicable; they can be dissolved in water and then the protein and the glycol can be mixed with the aqueous solution and processing be done as already described. The disadvantage is a higher processing cost, as special equipment is required and processing times are longer. Yet, the processing time depends to a great extent upon the degree of dehydration of the dispersion. When the dehydration is carried to a 20% water content, a fairly short processing time is required; it is naturally longer if the dispersion is to be completely anhydrous, though such dispersions are deemed not necessary for the intended purposes. For the usual applications, a 20% water content is not objectionable and might be as high as 30 or even 40%. When higher than 40%, poor printability of the inks made with the dispersions resulted. The preference of the lower concentrations of water resides in the desire to incorporate with these dispersions various resins such as rosin, phenol-formaldehyde resins, phenol modified hydrocarbon resins of the indene, coumarone, terpene or like types and other water-insoluble, yet glycol soluble resins. Many of them are soluble in non-anhydrous glycols and glycols with a limited amounted of water but insoluble in glycols contaminated with an unlimited amount of water.

The same modification is possible with guanidine and guanylurea. They are preferably made from guanidine carbonate and dicyandiamide, respectively, in aqueous solutions. An alternate method of using the two bases is their dehydration in glycol by distillation, either by fractional or azeotropic means, and subsequent incorporation of the substantially anhydrous solutions with the proper amount of glycol and soybean protein. The latter method shows a difference between guanidine carbonate and guanidine. When guanidine is used, foaming of the dispersion during processing is negligible and the batch may be heated to the processing temperature without holding it at an intermediate temperature for some length of time. In addition the processing time at the higher temperature can be shortened with the complete elimination of the intermediate temperature. A further advantage is the possibility of using lower processing temperatures for the preparation of the dispersions. Similar advantages are obtained by substituting guanylurea for guanidine. It is obvious that the bases themselves if reasonably pure may be substituted for diethylene triamine.

The soybean protein dispersions can be mixed with solutions of glycol-soluble resins and will improve the press stability of those resin solutions at high humidities. The soybean protein dispersions and their mixtures with resin-glycol solutions have the advantageous property of being printable on water-wet fibrous stock, whereas many of the present moisture-sensitive compositions have not this property. Inks made with the latter would consequently fail if used for this purpose.

Printing inks can be prepared from these protein dispersions in glycols. Printing inks can also be prepared from other vegetable proteins, such as alkaline extracted corn gluten proteins, cotton- seed globulin, hempseed globulin or the like, made up as the soybean protein ink. The concentrations of diethylene glycol and peptizing agents have to be adjusted for the different proteins. Thus, for the preparation of corn gluten protein, containing types of proteins as classified as albumen, globulin, and gliadin, the minimum amount for the peptization is less than for soybean protein by about 33%, whereas for cottonseed globulin and hempseed globulin dispersions in the respective glycols, the amount is about 25% larger.

Printing inks made from dispersions of casein and other proteins of animal origin, such as blood albumin, gelatin or the like, in polyhydric alcohols set to harder films than those made from soybean protein. When the protein dispersions are made up to viscosities higher than 30 poises, they are found to possess greater binding characteristics than the lower viscosity dispersions. Their preparation requires from 33 to 60% less of the peptizing agent than for the corresponding soybean protein dispersions.

It is also to be noted that the protein dispersions are usually alkaline; they have the tendency of coloring red litmus paper blue. The alkalinity of the dispersions is sometimes a disadvantage as it changes the hue of certain coloring materials and sometimes adversely affects the light fastness thereof.

These difficulties with alkali-sensitive pigments can be avoided by neutralizing or making the protein dispersions acid, with materials which react with the dispersing agents. Such reagents comprise phenols, isothiocyanates, acids, acidic resins, carbon disulfide, aldehydes, and acid esters. After the dispersions had been made neutral or slightly acid, none of the changes in the hue of the pigments took place.

The preferred glycols for the preparation of the dispersions of proteins of vegetabe and animal origin with the peptizing agents selected from the group of alkaline nitrogen compounds consisting of ammonia, amines, iminoamides, and carbonylamides are ethylene glycol, diethylene glycol, triethylene glycol, propylene glycol, dipropylene glycol and butylene glycol. In addition to these glycols, glycerol is a preferred trihydric alcohol.

The low molecular weight glycols, such as ethylene glycol, propylene glycol and butylene glycol are well adapted for dispersions to be used for inks designed for both steam-setting and heat-setting. Since these solvents have fairly low boiling points, inks made with them can also be used for air-drying purposes. The higher molecular weight polyhydric alcohols, such as the polyglycols, are more suitable for steam-setting inks specifically. There are several other glycols, such as pentanediols and hexanediols, which can be used in the dispersions. They require additions of small amounts of water for the formation of dispersions, or they can be added to highly concentrated protein dispersions, such as which contain 30 or 40% protein in ethylene glycol, propylene glycol, or the like, and thus reduce the degree of hygroscopic characteristics of the low molecular weight glycol.

All colloidal dispersions of the mentioned proteins may be blended with resins resulting in improved consistency of the ink as well as improved moisture-resistance of the printed films. In blends with resins, the protein dispersions usually impart hardness and moisture-tolerance to the inks and sometimes plastic flow. Resinous materials such as polymerized phenol-modified indene-coumarone resins, which are complex phenolic compounds of the group comprising partially polymerized phenol modified indene coumarone resins, alkyd resins, urea formaldehyde resins, rosin or the like, may be used for such purposes.

If neutralized or slightly acid dispersions are to be used instead of the alkaline dispersions, it is advantageous to effect the neutralization or slight acidification of the alkaline peptizing agents by the use of acid of higher molecular weight than acetic acid or propionic acid. We have found that maleic anhydride, phthalic anhydride, abietic, maleic or fumaric acid modified rosin, linseed oil fatty acid, acidic compounds as obtained by reacting the equivalent of one molecular weight of a dibasic acid with the equivalent of one molecular weight of a dihydric alcohol or the like, may be used for acidifying purposes. We have also found that the alkaline dispersions may be neutralized by the action of phenol, cresol, other phenols, phenol alcohols, phenyl isothiocyanate or the like. The polyhydric alcohols of the dispersions when reacted with dibasic acids such as maleic acid or its anhydride, fumaric acid or the like, form soft resins which have a tendency to harden by oxidation. The alkyd resins as well as the proteins possess a high tolerance for moisture, and in case of printing inks made therefrom the contribution of the proteins in the composition resides in an increasing hardness. In other compositions such as employing rosin, diethylene glycol soluble pure phenol formaldehyde resins, and tricarboxylic acids obtained from diene modified rosin esters, the proteins contribute hardness as well as water tolerance to the composition, whilst the resinous materials decrease the water absorption of the ink films.

Accordingly it is amoung the object of this invention to provide protein dispersions which may be used for preparing printing inks having a great tolerance for moisture.

Another object of this invention is to provide printing inks which will set to hard, water-resistant films when the printed films are exposed to moisture.

Another object of this invention is to provide for the economical production of dispersions which may be used for preparing printing inks.

The foregoing and other objects may be accomplished by using dispersions of which the following are illustrative embodiments:

*Example 1*

20 parts soybean protein, 3 parts guanidine carbonate, 3 parts dicyandiamide, 74 parts diethylene glycol are heated while stirring to 125–130° C. in about 15 minutes, held at this temperature for about two hours. Then carefully the temperature is raised to 140° C. in about 15 minutes and held at 140–145° C. to an apparent viscosity, at room temperature, of about 200 poises. The latter part of the reaction takes about 45 minutes.

The resulting dispersion is mixed and milled with 25 parts of carbon black for obtaining a printing ink. Instead of carbon black, other coloring materials can be substituted.

*Example 2*

The dispersion, as prepared in Example 1, is neutralized with glacial acetic acid (about 4 parts). The neutralization or addition of acetic acid has to be done cautiously as there is an evolution of considerable foam, which has to be broken up by vigorous agitation. After cooling, 65 parts of the vehicle are mixed and milled with 35 parts of Prussian blue.

*Example 3*

20 parts of soybean protein, 4 parts of ethylene diamine, and 76 parts diethylene glycol are heated while stirring to 130° C. in about 20 minutes and held between 130–135° C. to a viscosity at room temperature of about 300 poises. This reaction takes about 1½ hour. In another 10 minutes, a viscosity of about 200 poises is reached.

When the dispersion of Example 3 is acidified, there is but a negligible volume of foam produced.

*Example 4*

20 parts casein, 2 parts guanidine carbonate, and 78 parts diethylene glycol are heated, while stirring, for 3 hours at 80° C. Toward the end of this time, 2 parts acetic acid are cautiously added drop by drop. After cooling, 25 parts of carbon black are mixed with the dispersion, and the mixture is made homogeneous by passing it over a three-roller ink mill.

The viscosity of the protein dispersion before acidification was 288 poises.

*Example 5*

In the above composition of Example 4, diethylene triamine was substituted for guanidine carbonate. An apparent viscosity of 250 poises was obtained after heating for 1¼ hour at 80° C. No foam resulted when all of the acetic acid required for neutralization was added rapidly. This observation is unlike that of Example 4, in which great volumes of foam resulted during the neutralization.

*Example 6*

20 parts of casein, 3 parts of guanidine carbonate, and 77 parts of diethylene glycol are heated, while stirring, for ½ hour at 110° C. Toward the end of this time, 10 parts phthalic anhydride are slowly added and the temperature is raised to about 135° C. in about ten minutes and held there for 1 hour. After cooling, the vehicle is mixed with 30 parts lithol red.

*Example 7*

30 parts of acid casein, 3 parts of guanidine carbonate, and 67 parts of diethylene glycol are heated to 110° C. and stirred at this temperature for 1 hour, then, 16 parts phthalic anhydride are gradually added. Then the dispersion is heated at 110–120° C. for an additional hour. The vehicle is mixed and milled into an ink with 30 parts of carbon black.

*Example 8*

20 parts of soybean protein, 5 parts guanidine carbonate, and 75 parts of diethylene glycol are heated, while stirring, to 125–130° C. in about 15 minutes, held at this temperature for two hours, then carefully the temperature is raised to 135° C. and held there until a viscosity of 100 poises was reached. This operation took 11½ hours.

*Example 9*

20 parts of soybean protein, 4 parts of methylamine, and 76 parts of diethylene glycol are heated, while stirring to 135° C. (In 4 hours an apparent viscosity of 95 poises was reached.) At the end of this reaction period, 30 parts maleic anhydride and 10 parts of a soft phenolic modified indene-coumarone resin are added. The resulting dispersion is mixed with 60 parts lithol red, and the mixture is made homogeneous by passing it over a three-roller ink mill.

Example 10

30 parts of soybean protein, 2 parts of ethylene diamine, and 68 parts of ethylene glycol are heated while stirring at 140° C. for 1 hour, then 10 parts of rosin and 90 parts of phthalic anhydride are added and the mixture is heated for 3 hours more at 140° C. After this period, 60 parts of diethylene glycol and 60 parts of carbon black are mixed with the dispersion, and the mixture is later milled on a three-roller mill until homogenous.

Example 11

20 parts soybean protein, 2 parts diethylene triamine, and 78 parts diethylene glycol are heated at 135° C. for 6 hours. The resulting vehicle at this time has an apparent viscosity of about 75 poises. To the vehicle are added 10 parts of phthalic anhydride and 5 parts of diethylene glycol-soluble pure phenol formaldehyde resin, dissolved in triethylene glycol. The mixture is heated for 1 hour at 130 to 140° C. and is then mixed with 30 parts diethylene glycol and 200 parts chrome yellow. The mixture is milled to a homogenous ink on a three-roller mill.

In Example 11, all of the phthalic anhydride could be added at once and no noticeable foaming occurred, whereas in the neutralization of the dispersion of Example 8, the addition had to be conducted very gradually. A small portion was added at one time and then it was stirred until foaming ceased, when the next portion was added, etc.

Example 12

30 parts soybean protein, 2 parts of ethylene diamine, and 68 parts of ethylene glycol are heated to 135° C. and held at 135–145° C. for 30 minutes. Then 10 parts of rosin and 90 parts of phthalic anhydride are added. The mixture is held for 2 hours more at 135–140° C., after which it is diluted with 60 parts of diethylene glycol. The resulting dispersion is mixed with 100 parts lithol red.

Example 13

30 parts of soybean protein, 3 parts of guanidine carbonate, and 67 parts of ethylene glycol are heated to 125° C. in ½ hour, held at 125–130° C. for 2 hours, and then a powdered mixture of 84 parts phthalic anhydride and 8 parts of rosin are added cautiously in small portions to avoid excessive foaming. The dispersion is then heated for one hour more at 130–140° C. While cooling afterwards, 50 parts of diethylene glycol are added. The vehicle is made into an ink with 300 parts of chrome yellow.

Example 14

40 parts of casein, 6 parts of ethylene diamine, and 54 parts of ethylene glycol are mixed well and allowed to stand at room temperature overnight. Then it is heated to 130–140° C. in about 30 minutes, when there is added 120 parts of phthalic anhydride. The mixture is stirred at 130–140° C. for two hours, then it is cooled and 80 parts of diethylene glycol are added. This dispersion was made into an ink with 250 parts of chrome yellow.

Example 15

20 parts of soybean protein, 3 parts triethylenetetramine, and 77 parts of diethylene glycol are heated for 5 hours at 135° C. At the end of this period, 30 parts of fumaric acid modified rosin are added and the mixture is stirred at 135–140° C. until a homogeneous dispersion is obtained. Then 30 parts of diethylene glycol are added and the vehicle is permitted to cool. It was made into an ink with 40 parts of Phthalocyanine blue.

Example 16

20 parts of soybean protein, 3 parts tetraethylene pentamine, and 77 parts of diethylene glycol are heated for 3 hours at 140° C. and the resulting dispersion is acidified with fumaric acid modified rosin, diethylene glycol is later added, and the vehicle made into an ink as in Example 15.

Example 17

20 parts of soybean protein, 3 parts of ethylamine, and 77 parts of diethylene glycol were heated at 130° C. for 4 hours. The apparent viscosity was 275 poises.

Example 18

3 parts of diethylamine were substituted for ethylamine in Example 17. The resulting dispersion had an apparent viscosity of 290 poises.

Example 19

3 parts of triethylamine were substituted for ethylamine in Example 17. The resulting dispersion had an apparent viscosity of 250 poises.

Example 20

3 parts of tetraethylammonium hydroxide were substituted for ethylamine in Example 17. The resulting dispersion had an apparent viscosity of 220 poises.

Example 21

3 parts of n-propylamine were substituted for ethylamine in Example 17. The apparent viscosity of the dispersion was 325 poises.

Example 22

3 parts of tetrpropylammonium hydroxide were substituted in Example 17. The resulting vehicle had an apparent viscosity of 280 poises.

Example 23

20 parts soybean protein, 3 parts of dibutylamine, and 77 parts of diethylene glycol were heated to 140° for 2 hours. The resulting dispersion had a viscosity of 630 poises.

Example 24

20 parts soybean protein, 3 parts of tributylamine, and 77 parts of diethylene glycol were heated to 140° C. for 4 hours. The resulting vehicle had an apparent viscosity of 190 poises.

Example 25

20 parts of soybean protein, 3 parts of cyclohexylamine, and 77 parts of diethylene glycol were heated to 130° C. for 5 hours. The resulting dispersion had an apparent viscosity of 230 poises.

Example 26

20 parts of soybean protein, 3 parts of ethanolamine, and 77 parts of diethylene glycol was heated for 6 hours at 125° C. The resulting dispersion had an apparent viscosity of 530 poises.

Example 27

20 parts of soybean protein, 5 parts triethanolamine, and 74 parts of diethylene glycol were heated for 4 hours at 130° C. The resulting vehicle had an apparent viscosity of 380 poises.

Example 28

20 parts of soybean protein, 5 parts guanidine (base), and 75 parts diethylene glycol were heated to 135° C. for 5 hours. The resulting vehicle had an apparent viscosity of 110 poises.

Example 29

20 parts of soybean protein and 30 parts of diethylene glycol were added to a solution of 5 parts of guanylurea in 45 diethylene glycol. The mixture was heated at 125° C. for 4 hours. The resulting dispersion had an apparent viscosity of 870 poises.

Example 30

20 parts of soybean protein were added to an agitated solution of 5 grams ammonia in 75 parts of ethylene glycol, agitated at room temperature for about 16 hours and then heated gradually to 80° C. The resulting vehicle had an apparent viscosity of 1500 poises.

Example 31

20 parts of soybean protein, 4 parts of guanidine (base), and 76 parts of propylene glycol were heated at 135° C. for ½ hour. The resulting vehicle had an apparent viscosity of 20 poises.

Example 32

20 parts of soybean protein, 2 parts diethanolamine, and 78 parts propylene glycol were heated to 135° C. in ½ hour and held at this temperature for 2 hours. The resulting dispersion had an apparent viscosity of 31 poises.

Example 33

20 parts of soybean protein, 5 parts triethylene tetramine, and 75 parts of triethylene glycol were heated at 135° C. for 1 hour. The resulting vehicle had an apparent viscosity of 415 poises.

Example 34

20 parts soybean protein, 12 parts of guanidine (base), and 68 parts of tetraethylene glycol were heated at 135° C. for 3 hours. The resulting vehicle had an apparent viscosity of 12.5 poises. 20 parts of a hard phenolic modified indenecoumarone resin were dissolved and added to the protein dispersion as a 50% solution in tetraethylene glycol. This mixture was reacted with 5 parts of paraformaldehyde at 105° C. for 2 hours. The resulting vehicle was made into an ink with 220 parts chrome yellow. The yellow ink set readily when its prints were exposed to steam.

Example 35

20 parts soybean protein, 5 parts diethylene triamine, and 75 parts glycerol were heated to 135° and held at this temperature for 3 hours. The resulting vehicle had an apparent viscosity of 140 poises.

Example 36

20 parts of cottonseed globulin, 6 parts of diethylene triamine, and 74 parts diethylene glycol were heated to 135° C. and held at this temperature for 3 hours. The resulting viscosity of the dispersion was 190 poises.

Example 37

20 parts cottonseed globulin, 4 parts guanidine (base), 76 parts propylene glycol were heated to 135° C. and held at this temperature for 1 hour. The resulting viscosity of the vehicle was 27 poises.

Example 38

20 parts cottonseed globulin, 6 parts guanidine (base), 74 parts propylene glycol were heated at 135° for ½ hour. The resulting dispersion had an apparent viscosity of 22 poises.

Example 39

20 parts hempseed globulin, 6 parts diethylene triamine, and 74 parts diethylene glycol were heated at 135° C. for 3 hours. The resulting dispersion had an apparent viscosity of 175 poises.

Example 40

20 parts hempseed globulin, 6 parts guanidine (base), 74 parts propylene glycol were heated at 135° C. for ½ hour. The resulting dispersion had an apparent viscosity of 25 poises.

Example 41

20 parts of casein, 1½ parts of diethylene tetramine, and 78½ parts of diethylene glycol are heated to 80° C. and held at this temperature for 2 hours. The resulting dispersion had an apparent viscosity of 29 poises.

Example 42

20 parts of casein, 2 parts of dibutylamine, and 78 parts of diethylene glycol were heated at 110° C. for 15 minutes. The resulting dispersion had an apparent viscosity of 19 poises.

Example 43

30 parts of casein, 2 parts of ethylene diamine, and 68 parts of propylene glycol were heated at 110° C. for 2 hours. The resulting dispersion had an apparent viscosity of 95 poises.

Example 44

30 parts of casein, 3 parts of methylamine, and 67 parts of ethylene glycol were heated to 50° C. and stirred for 6 hours. The resulting dispersion had an apparent viscosity of 235 poises.

Example 45

30 parts of casein, 6 parts of ethylamine, 66 parts of dipropylene glycol, and 18 parts of water were heated to 90° C. and held at this temperature for 5 hours. The resulting dispersion had an apparent viscosity of 116 poises.

Example 46

30 parts of casein, 4 parts of guanidine (base), 66 parts of butylene glycol, and 10 parts of water were heated gradually to the reflux temperature, about 125° C., and held at reflux for 10 hours. The resulting dispersion had an apparent viscosity of about 145 poises.

Example 47

30 parts of casein, 6 parts of triethanolamine, and 64 parts of propylene glycol were heated at 130° C. for 6 hours. The resulting dispersion had an apparent viscosity of 85 poises.

Example 48

30 parts of casein, 5 parts of triethylene tetramine, and 65 parts of glycerol were heated at 95° C. for 4 hours. The resulting dispersion had an apparent viscosity of 112 poises.

Example 49

20 parts of corn (maize) gluten protein, 2 parts of guanidine (base), and 78 parts of diethylene glycol were heated at 135° C. for 1¼ hour. The resulting dispersion had an apparent viscosity of 43 poises.

*Example 50*

30 parts of corn gluten protein, 3 parts of diethylene triamine, and 67 parts of diethylene glycol were heated at 110° C. for 4 hours. The resulting dispersion had an apparent viscosity of 125 poises.

*Example 51*

30 parts of corn gluten protein, 3 parts of ethylene diamine, and 67 parts of propylene glycol were heated for 1 hour at 135°. The resulting dispersion had an apparent viscosity of 54 poises.

*Example 52*

30 parts of corn gluten protein, 3 parts of guanylurea, and 67 parts of ethylene glycol were heated at 90° C. for 4 hours. The resulting dispersion had an apparent viscosity of 184 poises.

*Example 53*

20 parts of soybean protein, 50 parts of a 10% aqueous diethylene triamine solution, and 75 parts of diethylene glycol are stirred in a suitable container, provided with thermometer, agitator and azeotropic distillation and reflux arrangement. The contents are heated to 80° C. where the dispersion usually become homogeneous on reaching this temperature. At the same time, the water-retaining container of the azeotropic distillation arrangement is filled with benzol and an additional 50 parts are added to the dispersion. Then, the contents are brought to the temperature where refluxing takes place. The water collected during the distillation is measured. After 40 parts have been collected, the azeotropic distillation is changed to a batch distillation system in order to take off the benzene used for the azeotropic distillation. The resulting dispersion is substantially anhydrous, containing not more than 1% of moisture. Though but 40 parts have been taken off by the initial part of the azeotropic distillation, the remaining 5 parts usually are distilled also before all of the benzene has been expelled. The apparent viscosity of the dispersion is about 350 poises. It can be lowered by longer heating.

Instead of distilling off all of the water, a clear, homogeneous dispersion results when but a portion of the water is eliminated. Good printing inks can be made when the water content of the dispersion is as high as 30%, though 20% is adjudged to be a safer limit, especially if the dispersion is mixed with a solution of a fumaric acid modified rosin in diethylene glycol.

Instead of soybean protein, any other water-soluble protein can be treated this way for the preparation of an anhydrous protein dispersion or one which contains a safe limit of water. When casein, blood albumin or maize protein is used, instead of 50 parts of a 10% amine solution, from 10 to 30 parts are sufficient to make homogeneous dispersions.

Instead of diethylene triamine, any other polyamine or any alkaline reacting amine can be used for peptizing the protein.

*Example 54*

20 parts of blood albumin, 3 parts of diethylene triamine, and 77 parts of diethylene glycol were heated at 135° C. for 2 hours. The resulting dispersion had an apparent viscosity of 117 poises.

*Example 55*

20 parts of blood albumin, 3 parts of guanidine (base), and 77 parts of propylene glycol were heated for 5 hours at 90° C. The resulting dispersion had an apparent viscosity of 54 poises.

*Example 56*

30 parts of blood albumin, 5 parts of triethylamine, and 65 parts of ethylene glycol were heated at 75° C. for 6 hours. The resulting dispersion had an apparent viscosity of 428 poises.

*Example 57*

30 parts of blood albumin, 6 parts of methylamine, 15 parts of water, and 64 parts of butylene glycol were heated at 80° C. The resulting dispersion, after 10 hours at 90° C. had an apparent viscosity of 63 poises.

The alkaline dispersions can be acidified so that they are neutral or acid. It has been demonstrated that acid reacting resins such as rosin, fumaric and maleic acid modified resins can be used in order to convert them from alkaline to acid dispersions. They may also be treated with phenolic resins, carbon disulfide, isothiocyanates, such as phenyl isothiocyanate, naphthyl isothiocyanates or the like, either in alkaline or in acid media. The objects of these treatments are improvements in steam-setting properties and water resistance of the dry ink films. Any of the dispersions can be mixed in any proportion with other steam-setting resins, such as rosin, maleic and fumaric acid modified rosin, diethylene glycol soluble alkyd resins, modified phenolic resins or the like. This mixing produces vehicles with better wetting properties for pigments.

Instead of the alkaline nitrogen compounds, their salts can be used for peptizing the proteins, as shown by the following:

*Example 58*

20 parts of soybean protein, 15 parts of ammonium thiocyanate, and 65 parts of diethylene glycol were heated at 155° C. for 4 hours. The resulting dispersion had an apparent viscosity of 9 poises.

*Example 59*

20 parts of soybean protein, 15 parts of ammonium acetate, and 65 parts of diethylene glycol were heated for 4 hours at 150° C. The resulting dispersion had an apparent viscosity of 26 poises.

*Example 60*

20 parts of soybean protein, 15 parts of ammonium oxalate, and 65 parts of diethylene glycol were heated for 5 hours at 150° C. The resulting dispersion had an apparent viscosity of 39 poises.

*Example 61*

20 parts of soybean protein, 15 parts of ammonium nitrate, and 65 parts of diethylene glycol were heated at 110° C. for 15 hours. The resulting dispersion had an apparent viscosity of 590 poises.

*Example 62*

20 parts of soybean protein, 15 parts of ammonium chloride, and 65 parts of diethylene glycol were heated at 160° C. for 3 hours. The resulting dispersion had an apparent viscosity of 31 poises.

The examples could be multiplied by showing other ammonium salts, or the dispersions formed with ethylene glycol, propylene glycol, butylene glycol, pentanediols, tetraethylene glycol, triethylene glycol, dipropylene glycol or the like, or dispersions can be shown made with blood albumin, casein, gelatin, corn gluten protein, hempseed globulin, cottonseed globulin or the like. It is obvious that any of the proteins can be dispersed with corresponding salts of amines and iminoamides.

All of the ammonium salts show that they have the tendency to peptize proteins in the glycols. Those with a heavy metal, such as the chromates, dichromates, molybdates or the like require high temperatures for dispersing the proteins; they show a great inclination of swelling the protein particles at the lower temperatures, below 150° C., but satisfactory dispersions can be made by merely milling the heterogeneous suspension on a paint mill into a homogeneous dispersion, which are usually of a deep black color.

The protein dispersion made with the salts of ammonium, amines, and iminoamides act similarly as those made with the alkaline amines. They can be mixed with the regular steam-setting resins to improve in inks their water tolerance and press stability at high humidities and impart greater hardness to the dry ink film. The mixtures of protein dispersion and steam-setting ink resin in solution improve the wetting properties of the vehicles for the pigments.

The simple glycols containing more than 3 carbon atoms per molecule and the polyglycols with 6 or more carbon atoms per molecule require small portions of water, such as about 10%, for the formation of the dispersions. With hexylene glycol, it is more convenient to form the substantially anhydrous dispersions, those which are made without the deliberate addition of water, and then mix them with hexylene glycol as a diluent or as a solution with a resin, such as rosin, phenol-formaldehyde resin, phenol modified indenes, coumarones, terpenes, or the like. This expedient can also be used with butylene glycols, pentanediols, dipropylene glycol, and other glycols otherwise requiring the presence of water for the formation of dispersions.

In addition to the salts of alkaline nitrogen containing compounds, the neutrally reacting carbonylimides and thiocarbonyl imides, such as urea and thiourea, can be used for the preparation of the dispersions, as shown by the following examples:

Example 63

20 parts of soybean protein, 15 parts of urea, and 65 parts of diethylene glycol were heated at 150° C. for 3 hours. The resulting dispersion had an apparent viscosity of 19 poises.

Example 64

20 parts of soybean protein, 15 parts of thiourea, and 65 parts of diethylene glycol were heated at 150° C. for 3 hours. The resulting dispersion had an apparent viscosity of 16 poises.

Example 65

20 parts of casein, 6 parts of urea, and 74 parts of ethylene glycol were heated at 50° C. for 24 hours. The resulting dispersion had an apparent viscosity of 131 poises.

Example 66

20 parts of gelatin, 6 parts of thiourea, and 74 parts of propylene glycol were heated for 24 hours at 50° C. The resulting dispersion had an apparent viscosity of 68 poises.

The examples demonstrate the usefulness of carbonylimides and thiocarbonylimides. It is obvious that the same principle of dispersion can be applied to other proteins and to other polyhydric alcohols, including glycerine.

Instead of elevated temperatures, room temperatures can be used with ethylene glycol for the formation of the substantially anhydrous dispersions. It is merely necessary to extend the period of agitation to about 24 hours or more. Instead of ethylene glycol, the glycols propylene glycol and diethylene glycol with the addition of about 10% water can be used for the formation of dispersions at room temperature or just slightly elevated temperatures. These dispersions, it has been found, have superior adhesive properties, very light color and substantially no odor. They, like the other dispersions prepared at more elevated temperatures, can be used in mixtures with solutions of other glycol-soluble resins and film-forming substances for the improvement of hardness of the films, press stability of the inks, and pigment wetting properties of the ink vehicles.

The expedient of milling the heterogeneous dispersions on a paint or ink mill can also be applied to any other dispersion other than those made with the chromates, molybdates, tungstates of ammonium, amines, or iminoamides. Should by any irregularity during the dispersion procedure, a portion of the dispersion contain gel-like particles, milling will eleminate the particles with the formation of a homogeneous vehicle.

When the acid or alkaline dispersions are mixed with dispersions of zein, the otherwise great tendency of zein to gel spontaneously is greatly reduced. This gelling tendency of zein dispersions in alcohol and glycols has always been a great obstacle for utilizing this excellent film-forming protein. It is greatly enhanced in the presence of pigments, such as pigment pastes; but it was found to be absent when mixtures were made with 30 to 60% of the zein dispersion substituted by the dispersions of the alcohol-insoluble proteins. Inks made with chrome yellow, cadmium yellow, Prussian blue, lithol red and toluidine toners with the mixtures showed no signs of gel formation after storage for more than a year. They had retained their printable consistency.

When butylene glycols, pentanediols, hexanediols, and dipropylene glycol are used as diluents for the protein dispersions made without the addition of water it is most convenient to have a very high concentration of protein so that by dilution the binding material is about 20%. For this purpose, the 30 or 40% protein dispersions are preferably used, though the 20% protein dispersions or even the 10% protein dispersions are suitable for blending, especially when they are to be blended with solutions of resins in these glycols, such as rosin and glycol-soluble resins.

In the previously mentioned blends, it has been found that even rosin can be used to advantage. Rosin by itself does not form stable solutions in glycols, such as butylene glycol, pentanediols, hexanediols, and dipropylene glycol. After several days of standing, these solutions become heterogeneous. Both the initially homogeneous and the aged heterogeneous rosin-containing glycols can be used for blending with the formation of homogeneous dispersions or vehicles, which are suitable for printing inks.

It is understood that this invention is not limited to the precise embodiments of the described compositions and that changes may be made without departing from its scope, as described and defined in the appended claims.

What is claimed is:

1. A printing ink vehicle consisting essentially of a dispersion of a binder, a protein peptizing agent and a substantially anhydrous hygroscopic liquid, said binder consisting essentially of a dry, substantially anhydrous, non-prolamine protein having high water tolerance and being dispersible in ethylene diamine, said protein being dispersed by the action of ethylene diamine, said liquid consisting essentially of a polyhydric alcohol having 2-3 hydroxy groups and 2-8 carbon atoms, said printing ink vehicle having a high humidity and water tolerance and being readily settable on exposure to steam.

2. The printing ink vehicle set forth in claim 1 wherein the protein comprises soybean protein.

3. The printing ink vehicle set forth in claim 1 wherein the protein comprises casein.

4. The printing ink vehicle set forth in claim 1 wherein the protein comprises corn gluten protein.

5. The printing ink vehicle set forth in claim 1 wherein the protein comprises gelatin protein.

6. The printing ink vehicle set forth in claim 1 wherein the protein comprises cottonseed protein.

7. A printing ink consisting of coloring matter in a dispersion of a resin binder, a protein binder, a protein peptizing agent and a substantially anhydrous hygroscopic liquid, said binder consisting essentially of a dry, substantially anhydrous non-prolamine protein having high water tolerance and being dispersible in ethylene diamine, said protein being dispersed by the action of ethylene diamine, and said liquid consisting essentially of a polyhydric alcohol having from 2 to 3 hydroxy groups and 2 to 8 carbon atoms, said printing ink having a high humidity and water tolerance and being readily settable on exposure to steam.

8. The printing ink set forth in claim 7 wherein the protein comprises soybean protein.

9. The printing ink set forth in claim 7 wherein the protein comprises casein.

10. The printing ink set forth in claim 7 wherein the protein comprises corn gluten protein.

11. The printing ink set forth in claim 7 wherein the protein comprises gelatin protein.

12. The printing ink set forth in claim 7 wherein the protein comprises cottonseed protein.

ALFRED F. SCHMUTZLER.
DONALD F. OTHMER.

REFERENCES CITED

The following references are of record in the file of this patent:

UNITED STATES PATENTS

| Number | Name | Date |
|---|---|---|
| 1,621,541 | Honkins | Mar. 22, 1927 |
| 1,844,199 | Bicknell et al. | Feb. 9, 1932 |
| 1,930,178 | Mizener | Oct. 10, 1933 |
| 2,185,110 | Coleman | Dec. 26, 1939 |
| 2,213,474 | Puetzer | Sept. 3, 1940 |
| 2,322,927 | Drewsen et al. | June 29, 1943 |
| 2,332,066 | Erickson | Oct. 29, 1943 |
| 2,366,970 | Kroeger | Jan. 9, 1945 |
| 2,396,430 | Massarene | Mar. 12, 1946 |
| 2,453,752 | La Piana | Nov. 16, 1948 |